(12) United States Patent
Dialani et al.

(10) Patent No.: US 12,456,052 B2
(45) Date of Patent: Oct. 28, 2025

(54) SYSTEMS AND METHODS FOR FACILITATING VERIFIABILITY OF MACHINE LEARNING MODEL UNLEARNING

(71) Applicant: Coinbase, Inc., Oakland, CA (US)

(72) Inventors: Vijay Dialani, Fremont, CA (US); Bhaskar Krishnamachari, Los Angeles, CA (US); Rajarshi Gupta, Los Altos, CA (US)

(73) Assignee: Coinbase, Inc., Oakland, CA (US)

( * ) Notice: Subject to any disclaimer, the term of this patent is extended or adjusted under 35 U.S.C. 154(b) by 146 days.

(21) Appl. No.: 18/535,767

(22) Filed: Dec. 11, 2023

(65) Prior Publication Data

US 2025/0190784 A1    Jun. 12, 2025

(51) Int. Cl.
    *G06N 3/08*      (2023.01)
    *G06F 16/22*     (2019.01)
    *G06F 16/27*     (2019.01)
    *G06N 3/0475*   (2023.01)
    *H04L 9/00*      (2022.01)
    *H04L 9/32*      (2006.01)

(52) U.S. Cl.
    CPC ............ *G06N 3/08* (2013.01); *G06F 16/2255* (2019.01); *G06F 16/27* (2019.01); *G06N 3/0475* (2023.01); *H04L 9/3218* (2013.01); *H04L 9/50* (2022.05)

(58) Field of Classification Search
CPC ........ G06N 3/08; G06N 3/0475; G06F 16/27; G06F 16/2255; H04L 9/50; H04L 9/3218
USPC ......................................................... 713/155
See application file for complete search history.

(56) References Cited

U.S. PATENT DOCUMENTS

| | | | |
|---|---|---|---|
| 2023/0118785 A1* | 4/2023 | Ullah ................... | G06N 3/088 706/25 |
| 2023/0316086 A1* | 10/2023 | Singh ................... | G06N 3/0464 706/14 |
| 2024/0086760 A1* | 3/2024 | Fraboni ................ | G06N 20/00 |

* cited by examiner

*Primary Examiner* — Zi Ye
(74) *Attorney, Agent, or Firm* — Foley & Lardner LLP

(57) ABSTRACT

In certain embodiments, model unlearning verifiability may be facilitated. In some embodiments, in connection with a request for unlearning of a dataset for a machine learning model, an unlearning process may be performed on the machine learning model, where the unlearning process involves multiple stages, for the unlearning of the dataset, at which model instances of the machine learning model are respectively generated. One or more proofs or hash-based values corresponding to the model instances may be generated, such as first and second hash-based values corresponding to first and second model instances of the machine learning model generated at first and second stages of the unlearning process, respectively (e.g., where the second stage depends on the first stage). The proofs or hash-based values may then be stored at one or more database locations of a database to enable verification of the performance of the unlearning process.

20 Claims, 8 Drawing Sheets

SYSTEMS AND METHODS FOR FACILITATING VERIFIABILITY OF MACHINE LEARNING MODEL UNLEARNING

SUMMARY

Methods and systems are described herein for novel uses and/or improvements to facilitate verifiability of model unlearning. As one example, methods and systems are described herein for enabling verification of the removal of certain data from large language models or other machine learning models to address current and future privacy or data ownership demands, such as the "Right to Be Forgotten" that allows individuals to request the deletion of their personal data from a company's records. Although recent research has uncovered a number of potential candidates for model unlearning (e.g., other than the resource-intensive process of retraining the model from scratch without the specified data), verifying the removal of data from a generative model poses its own technical challenges. While complete model retraining is a potential solution, it is not practical for large generative models. Companies might rely on audit trails or transparency reports to demonstrate compliance, but these often lack detailed insights due to the models' technical complexity and proprietary nature. Moreover, direct inspection of a generative model's intricate network of weights and biases to check for data removal is not currently feasible with conventional methods. For example, even if an organization can demonstrate that their updated model exhibits weight changes, it remains unclear if these changes are indeed the result of an unlearning process to remove the specified data from the machine learning model. This ambiguity is especially pronounced in generative models that handle image and voice data, where unlearning may not be evident. These models might be capturing stylistic patterns from other data sources, making it difficult to ascertain if specific data has been unlearned. Hence, there is a pressing need for a mechanism that can reliably verify the unlearning process, especially when it involves personally identifiable information (PII) or other sensitive data or loss of data rights or protections.

To overcome these technical deficiencies in preexisting systems, methods and systems disclosed herein facilitate verifiability of model unlearning, for example, by performing an unlearning process involving multiple stages that result in respective model instances of a target machine learning model and then generating and storing hash-based values corresponding to the model instances to enable a verification system to verify that the unlearning process has actually been performed. In some embodiments, in connection with a removal request to remove a dataset from a machine learning model, a system may generate token subsets corresponding to data subsets of the dataset and perform an unlearning process that involves multiple unlearning stages at which different ones of the token subsets are used to respectively generate model instances of the machine learning model. In connection with the unlearning process, the system also generates hash-based values corresponding to the model instances, such as (i) a first hash-based value corresponding to a first model instance derived from a starting model instance of the generative machine learning model at a first unlearning stage of the unlearning process, (ii) a second hash-based value corresponding to a second model instance derived from the first model instance at a second unlearning stage of the unlearning process, (iii) a third hash-based value corresponding to a third model instance derived from the second model instance at a third unlearning stage of the unlearning process, and (iv) so on. In some embodiments, the system may store the hash-based values on a distributed database, such as one configured with a consensus mechanism for committing to a synchronized state of the distributed database across nodes of the distributed database. In this way, for example, the system enables a verification system to verify performance of the unlearning process (e.g., by allowing the verification system to use the hash-based values to confirm that each of the corresponding stages of the unlearning process was actually completed, as described herein).

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
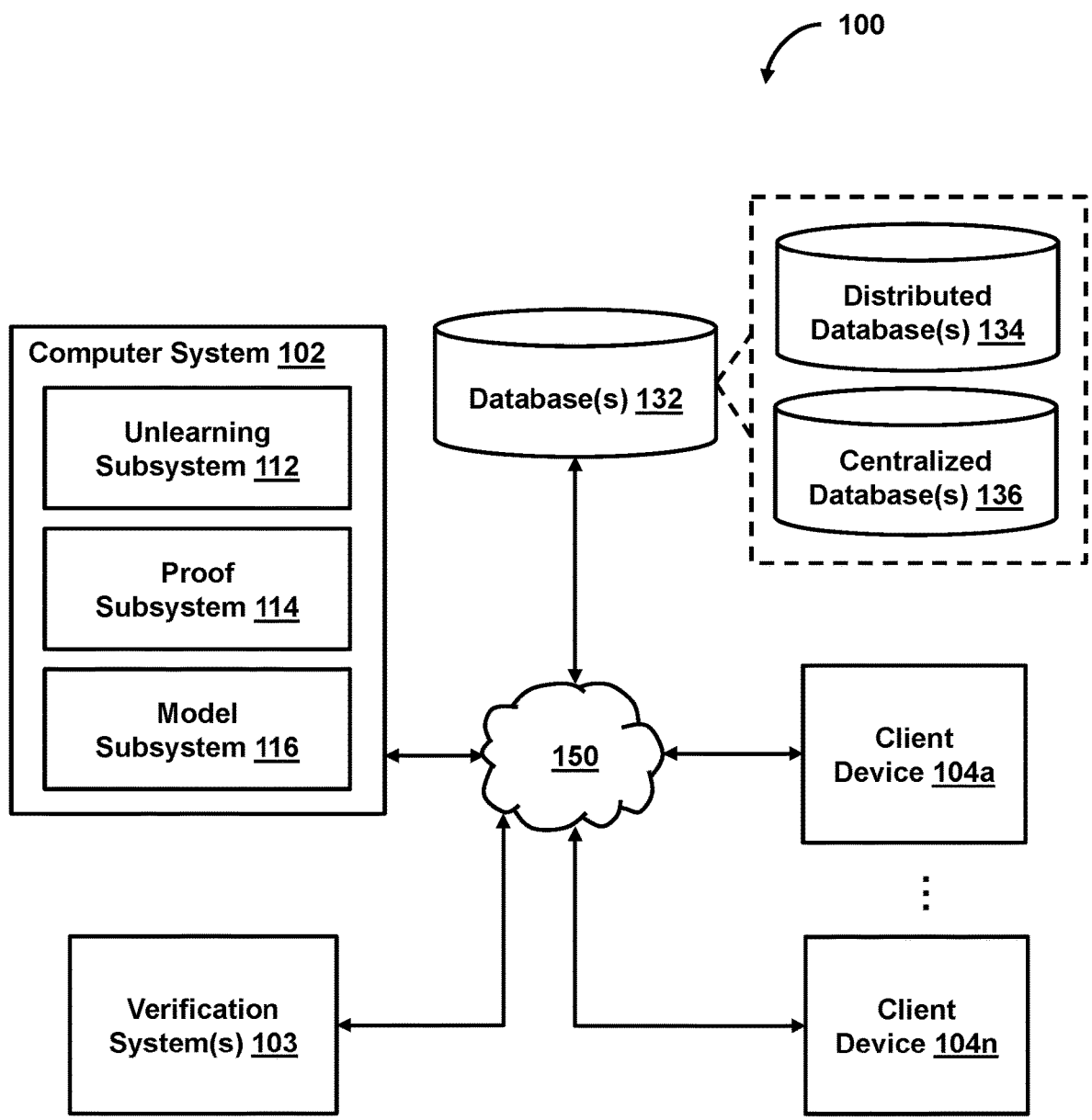
FIG. 1 shows a system for facilitating model unlearning verifiability, in accordance with one or more embodiments.

FIG. 1 shows a system 100 for facilitating model unlearning verifiability, in accordance with one or more embodiments. As shown in FIG. 1, system 100 may include computer system 102, verification system 103, client device 104 (or client devices 104a-104n), or other components. Computer system 102 may include unlearning subsystem 112, proof subsystem 114, model subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

As discussed, although recent research has uncovered a number of potential candidates for model unlearning, verifying the removal of data from a large language model or other machine learning models poses its own technical challenges. While complete model retraining is a potential solution, it is not practical for large models. Companies might rely on audit trails or transparency reports to demonstrate compliance, but these often lack detailed insights due to the models' technical complexity and proprietary nature. Moreover, direct inspection of a large model's intricate network of weights and biases to check for data removal is not currently feasible with conventional methods. For example, even if an organization can demonstrate that its updated model exhibits weight changes, it remains unclear if these changes are indeed that result of an unlearning process to remove the specified data from the machine learning model. This ambiguity is especially pronounced in generative models that handle image and voice data, where unlearning may not be evident. These models might be capturing stylistic patterns from other data sources, making it difficult to ascertain if specific data has been unlearned.

In some embodiments, system 100 may enable model-unlearning-related verifications by performing an unlearning process that includes one or more portions that result in respective model instances of a target machine learning model and then generating and storing one or more cryptographic values corresponding to the model instances. In this way, for example, system 100 enables a verification system to verify performance of the unlearning process (e.g., by allowing the verification system to use the cryptographic values to confirm that each of the corresponding portions of the unlearning process was performed, as described herein). It should be noted that, although some embodiments are described herein with respect to hash-based values, other cryptographic values (e.g., proofs that do not require use of any hash function) may be generated or stored in lieu of or in addition to hash-based values in other embodiments.

In some embodiments, system 100 may perform an unlearning process on a machine learning model with respect to data indicated in a request. In connection with the unlearning process, system 100 may generate one or more hash-based values corresponding to one or more model instances (resulting at one or more portions of the unlearning process) and cause storage of the hash-based values on a database. As an example, the hash-based values may include (i) a first hash-based value corresponding to a first model instance of the machine learning model generated at the first portion of the unlearning process, (ii) a second hash-based value corresponding to a second model instance of the machine learning model generated at a second portion of the unlearning process, (iii) a third hash-based value corresponding to a third model instance of the machine learning model generated at a third portion of the unlearning process, and (iv) so on.

In some embodiments, a verification system (e.g., verification system 103) associated with a verifier may perform verification that the unlearning process was performed on the machine learning model. As an example, with a copy of the machine learning model (e.g., including the same weights of the machine learning model on which the unlearning process was to be performed), the verification system may perform the portions of the unlearning process at which the model instances (corresponding to the database-stored hash-based values) are generated. Using the known generation protocols (used to generate the database-stored hash-based values), the verification system may then generate one or more hash-based values corresponding to the model instances. If the verifier-generated hash-based values match the database-stored hash-based values (e.g., that are purported to represent the user interactions), the verification system may confirm that the unlearning process was performed. As an example, the verification system may generate such confirmation based on a determination that the hash-based values generated by the verification system are the same as the database-stored hash-based values (e.g., and, thus, the verifier-generated model instances generated by the verification system are the same as the model instances used to generate the database-stored hash-based values).

In some embodiments, system 100 may facilitate verification that interactions with a machine learning model are with a model resulting from an unlearning process (e.g., an unlearning process initiated in connection with a request to remove certain data from the machine learning model or with one or more other unlearning requests). For example, with respect to a resulting model instance (e.g., resulting from the unlearning process), system 100 may generate one or more hash-based values based on one or more user interactions with the resulting model instance and cause storage of the hash-based values on a database (e.g., to enable verification that the resulting model instance has been placed into an environment). As an example, a verification system associated with a verifier may use the hash-based values to verify that the resulting model instance has been placed in a production environment, that the resulting model instance has replaced a prior instance of the machine learning model in an environment, etc. (e.g., as described below or herein elsewhere).

Subsystems 112-116

In some embodiments, unlearning subsystem 112 may perform an unlearning process on a machine learning model with respect to data indicated in a request (e.g., a request to remove the data from the machine learning model or for the machine learning model to otherwise unlearn such data). In connection with the unlearning process, proof subsystem 114 may generate one or more hash-based values corresponding to one or more model instances (resulting at one or more portions of the unlearning process) and cause storage of the hash-based values on a database. As an example, the hash-based values may include (i) a first hash-based value corresponding to a first model instance of the machine learning model generated at the first portion of the unlearning process, (ii) a second hash-based value corresponding to a second model instance of the machine learning model generated at a second portion of the unlearning process, (iii) a third hash-based value corresponding to a third model instance of the machine learning model generated at a third portion of the unlearning process, and (iv) so on.

In some embodiments, an unlearning process may be configured to be decomposable into operation sets (e.g., represented by a directed acyclic graph), where one or more operation sets of the unlearning process have dependencies on one or more other operation sets of the unlearning process. As an example, the unlearning process may include a first stage, a second stage that depends on the first stage, a third stage that depends on the second stage, and so on. In one use case, a first model instance of the machine learning model is generated at the first stage, a second model instance of the machine learning model is generated at the second stage, a third model instance of the machine learning model is generated at the third stage, and so on.

In some embodiments, with respect to a dataset to be unlearned by a machine learning model (e.g., a subset of a training dataset used to train a machine learning model), unlearning subsystem 112 may generate token subsets corresponding to data subsets of the dataset to be unlearned and use the token subsets in one or more portions of the unlearning process to respectively generate one or more model instances. In some use cases (e.g., where homomorphic encryption techniques are applied), the token subsets may be respectively encrypted versions of the data subsets of the dataset to be unlearned.

In some embodiments, although unlikelihood training techniques are typically used to refine language models (e.g., by specifically targeting and reducing repetitive text or biased statements), unlikelihood training techniques may be used as part of the unlearning process. In one scenario, instead of training the machine learning model to just predict the next word in a sequence (e.g., as done with typical training methods), the machine learning model may be trained to reduce the likelihood of generating these "sensitive" tokens (of the dataset to be unlearned). Unlearning subsystem 112 may, for example, penalize the model when the model produces or predicts these identified tokens, effectively causing the model to "forget" such information (e.g., significantly reduce its propensity to generate the sensitive information, thereby mitigating privacy risks). In such a scenario, the model adjusts its weights or other parameters to decrease the probability of the unwanted outputs. The foregoing operations may be iteratively performed, which involves continuous evaluation and adjustment of the unlikelihood targets, so that the final model satisfies one or more predetermined criteria. For example, a threshold number of iterations are performed before the resulting model is determined to be the final model. Additionally, or alternatively, direct testing of the model may be performed (e.g., test the model with queries specifically designed to elicit responses that would have included the unlearned information prior to the unlikelihood training). As another example, one or more statistical analyses may be performed on the model (e.g., a frequency analysis of the tokens or information that was the target of unlearning, where a significant reduction in their occurrence in the model's outputs indicates successful unlearning).

Figure 2A:
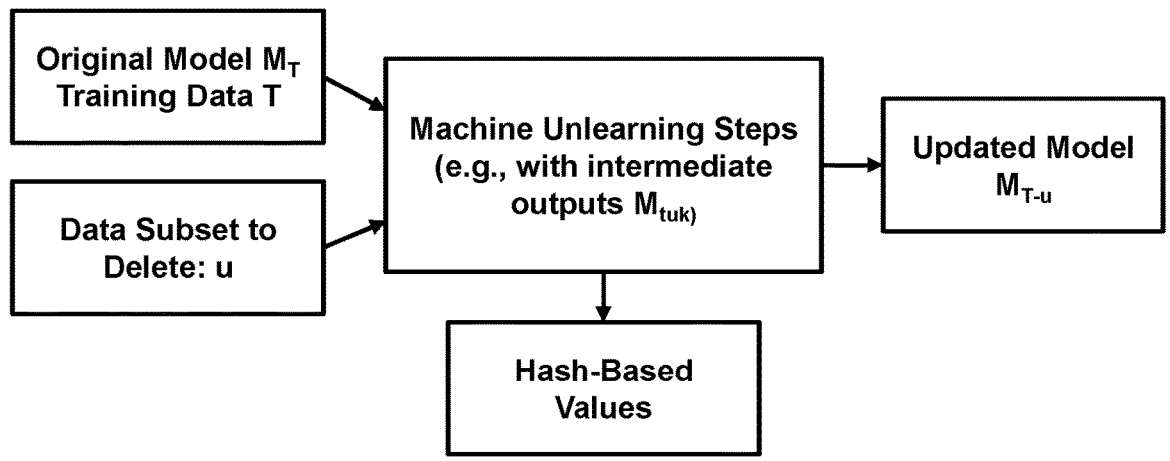
FIGS. 2A-2C show diagrams for facilitating model unlearning verifiability, in accordance with one or more embodiments.

In some embodiments, the unlearning process may be configured to be decomposable into one or more linear series of deterministic steps. As an example, an unlikelihood training process may be configured or transformed into a series of deterministic operation sets. As another example, with respect to one use case (see FIG. 2A):

the unlearning process is represented by a linear series of transformations of the machine learning model;

$M_T$ is a given model trained on a set of data T;

u is the training data that is to be removed (e.g., corresponding to a particular user);

$M_{T-u}$ is the updated model (e.g., after the training data from the user is no longer part of the model);

$f_u(\ )$ is the process of unlearning the data u as a mapping or transformation;

$f_u$ is a mapping represented as f: $M_T \rightarrow M_{T-u}$ (or, alternatively, $M_{T-u}=f(M_T)$), where $f_u$ may be represented as a composition of K successive mappings, such as $f_{u1}$, $f_{u2} \ldots f_{uK}$ (i.e., $f=f_{uK} \cdot f_{uK-1} \cdot \ldots \cdot f_{u2} \cdot f_{u1}$);

$M^{Tuk}$ is the output corresponding to the $k^{th}$ stage of processing (i.e., of $f_{uk} \cdot f_{uk-1} \cdot \ldots \cdot f_{u2} \cdot f_{u1}$ applied to $M_T$);

$H_{Tuk}$ is the output of a hash function applied to $M_{Tuk}$.

In this use case, for example, the scheme may be as follows (including a proof generation and a verification step), where the verifier has access to $M_T$ (including its weights), T, u, and knowledge of the unlearning process (e.g., the deterministic unlearning process represented above by the sequential set) (see FIG. 2B):

Proof Generation: Upon receiving a deletion request for training data u: For each k=1 to K, generate $M_{Tuk}$, and compute its hash $H_{Tuk}$; Log $H_{Tuk}$ on a blockchain (or other distributed database); send a pointer to the logged sequence of hashes $H_{Tu1}$ to $H_{TuK}$ to the individual or third-party auditor that needs to do the verification. This serves as the proof.

Verification of Unlearning Process: When an individual or third-party auditor (or other verifier) wants to verify, the verifier can start with the original model $M_T$ and data T and the input of what data to remove from the training set u. The verifier may then run through the same chain of computations of the unlearning process (e.g., in the same order as performed by the prover). The verifier would be able to verify that each of the intermediate hashes $H_{Tuk}$ and the final hash $H_{TuK}$=hash ($M_{T-u}$) matches the set of hashes stored on the blockchain (or other distributed database).

In the above use case, while the verifier has access to the original model (and its weights) $M^T$, the original training data T, and the user-specific data u that is to be unlearned (e.g., and later knows the weights of the model after the unlearning has been performed), no other third party (other than other authorized verifiers) would know such details because all that is logged on the blockchain are hashes of intermediate computation outputs (e.g., from which no useful information could be derived due to the pre-image resistance of strong hash functions). It should be noted that, in other use cases, the verifier does not need access to one or more of the foregoing data (e.g., the original model $M^T$, the original training data T, the intermediate models generated during the unlearning process, or the final model $M_{T-u}$ generated from the unlearning process, etc.).

Figure 2B:
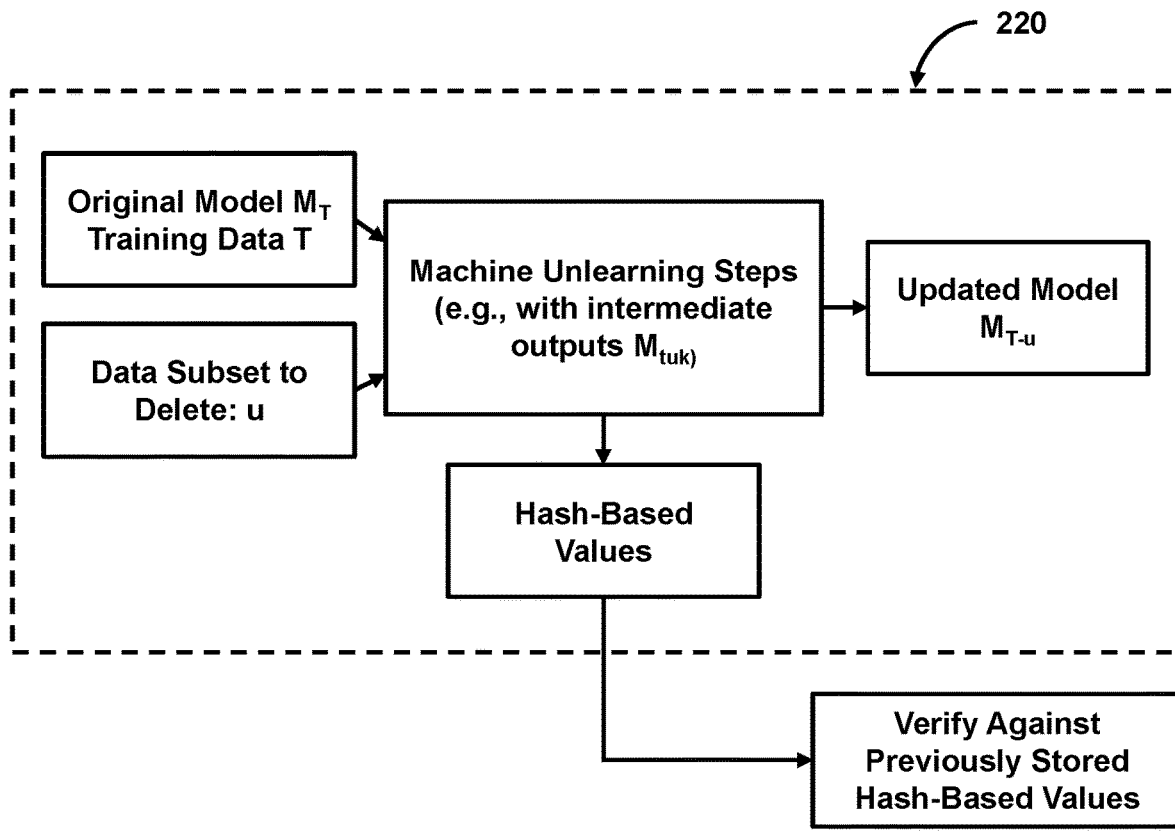

In some embodiments, verification may involve use of a physically secured facility (e.g., a sensitive compartmentalized information facility), a trusted execution environment, homomorphic encryption, zero-knowledge proofs, or other secured techniques. As an example, the physically secure facility may include a facility of a proving entity (e.g., that initially generated and stored hash-based values corresponding to model instances of respective steps of an unlearning model performed on a machine learning model) or a third-party entity facilitating the verification process (e.g., on behalf of the proving entity). In one use case, at the physically secured facility (e.g., where environment 220 of FIG. 2B represents such facility), a verifier (e.g., via a verification system of the facility) may execute each respective portion of the unlearning process (e.g., used to generate hash-based values stored in a database) and generate the hash-based values corresponding to the respective portions of the unlearning process. As shown in FIG. 2B, the verifier may then use the generated hash-based values to verify against the hash-based values stored in the database. In another use case, the verifier may enter the facility with a copy of the hash-based values from the database and verify those hash-based values against the hash-based values generated during the foregoing physically secured facility verification process. As such, such embodiments may minimize the possibility of the training data, model weights, or other sensitive data being leaked to a third party.

In some embodiments, with respect to the use of a trusted execution environment (e.g., a segregated area of memory and processing hardware safeguarded from the rest of the device/system through encryption), any data within the trusted execution environment remains inaccessible and immune to tampering by any code external to this trusted execution environment. While code execution is performed within the environment in an unencrypted state, it is only available in encrypted form to any external attempts at access. As such, in one scenario (e.g., where environment 220 of FIG. 2B represents the trusted execution environment), the initial inputs (e.g., the original model MT, the original training data T, the user-specific data u that is to be unlearned, etc.) may be used to execute the unlearning process within the trusted execution environment and generate the hash-based values. In this way, for example, the verifier can be confident that the correct verification process is being used, but the actual details of the verification process, such as the values of the training data and the model weights (e.g., before and after the unlearning process) would be run on the trusted hardware and kept hidden from the verifier. For example, the only output made available to the verifier may be the hash-based values (e.g., corresponding to the respective portions of the unlearning process or the respective model instances generated at such portions), which may be used as a comparison against the corresponding hash-based values stored on the database.

In some embodiments, the verification process may be performed using homomorphic encryption (e.g., fully homomorphic encryption or other homomorphic encryption techniques). As an example, homomorphic encryption is a form of encryption that allows computation to be carried out on ciphertexts, generating an encrypted result which, when decrypted, matches the result of operations performed on the plaintext. In one use case, instead of only encrypting the training data, both the training data (e.g., the original training data, the data subset to be unlearned, etc.) and the model (e.g., T and $M_T$) may be encrypted, and the unlearning subsystem 112 may perform the unlearning process based on the encrypted training data and encrypted model (e.g., with the weights of the original model being encrypted).

In another use case, at each respective portion of the unlearning process, unlearning subsystem 112 may generate an encrypted model instance (e.g., intermediate model instance or one or more sets of weights thereof) derived from the original encrypted model, and proof subsystem 114 may generate one or more hash-based values corresponding to the encrypted model instance and store the hash-based values in the database for verification. In a further use case, during the last portion of the unlearning process (e.g., at which a model instance is generated), unlearning subsystem 112 may generate the encrypted final model instance (e.g., the "new" model or its weights that satisfy a data removal request or one or more criteria related to such data removal request), and proof subsystem 114 may generate one or more hash-based values corresponding to the final encrypted model instance and store the hash-based values in the database for verification.

As such, in another use case, a verification system (e.g., verification system 103) may perform the verification process by (i) obtaining the encrypted original model (e.g., trained on the original training data) and the encrypted data to be unlearned, (ii) performing the foregoing steps of the subsystems 112-114 to generate the respective hash-based values, and (iii) using the generated hash-based values to verify against the stored hash-based values.

Additionally, or alternatively, in some embodiments, a prover entity may demonstrate that the respective portions of the unlearning process have been performed using one or more zero-knowledge proof techniques (e.g., without revealing details of $M_T$, T, and $M_{T-u}$). For example, in some embodiments, in connection with an unlearning process, proof subsystem 114 may generate one or more hash-based values corresponding to one or more model instances resulting at one or more portions of the unlearning process (e.g., stages of the unlearning process or other portions that include operation sets of the unlearning process) by generating one or more zero-knowledge proofs corresponding to the model instances. As an example, the proofs may include (i) a first zero-knowledge proof corresponding to a first model instance, (ii) a second zero-knowledge proof corresponding to a second model instance, (iii) a third zero-knowledge proof corresponding to a third model instance, and (iv) so on. Such proofs are cryptographic proofs that allow one party (the prover) to prove to another party (the verifier) that a certain statement is true, without revealing any information about the statement itself. Examples of zero-knowledge proof techniques (via which such embodiments are implemented) may include zk-SNARKs (Zero-Knowledge Succinct Non-Interactive Argument of Knowledge), zk-STARKs (Zero-Knowledge Scalable Transparent Argument of Knowledge), Bulletproofs, zk-Rollups, Halo, or other zero-knowledge proof techniques or aspects thereof.

With respect to zero-knowledge proofs, for example, the prover wants to prove they know a secret that satisfies a certain computation, without revealing the secret. In one use case, the prover may transform the computation into an arithmetic circuit, such as like $f(x)=x^2+3x+5$, where the goal is for the prover to prove that the prover knows x such that f(x) equals a certain value (e.g., 17) without revealing x. The prover then transforms the arithmetic circuit into a quadratic arithmetic program (e.g., a system of polynomial equations that represent the circuit's operations). The prover subsequently computes a "witness" (e.g., the solution to the quadratic arithmetic program), proving that the prover knows the secret. In this case, for x such that f(x)=17, the prover calculates the values of the circuit that make the polynomials true. In some embodiments, a one-time trusted setup ceremony to generate common reference strings (e.g., including a prover key for the prover and a verifier key accessible to a verifier) may be performed. With respect to the foregoing use case, the prover may generate a zero-knowledge proof using the computed witness and the prover key, where the zero-knowledge proof demonstrates the truth of the statement without revealing the secret (e.g., a proof that includes values like A(s), B(s), C(s) for a secret random s, showing that $A(s)*B(s)-C(s)=0$ without revealing x). With respect to the proof verification, the verifier may check the proof using the verifier key (e.g., the verifier checks if the provided proof values satisfy the quadratic arithmetic program using the verifier key), confirming the validity of the statement without learning x.

In some embodiments, unlearning subsystem 112 may transform the unlearning process into one or more arithmetic circuits (e.g., that represent respective stages or portions of the unlearning process at which the model instances of the machine learning model are generated).

Figure 2C:
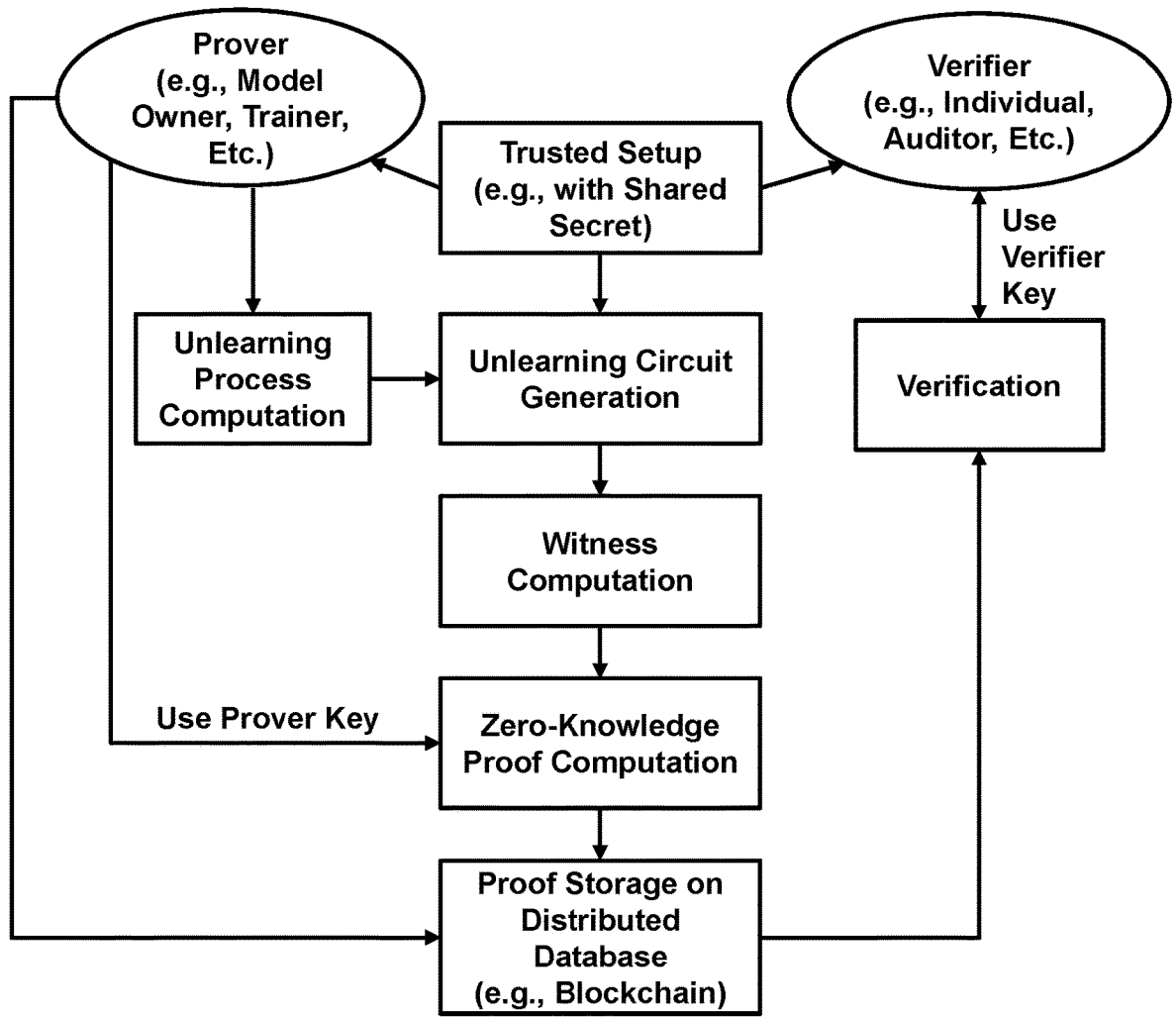

For example, with respect to FIG. 2C, a prover system may convert the entire computation associated with the unlearning process into the arithmetic circuits (e.g., using a rank-1 constraint system (R1CS), a quadratic arithmetic program (QAP), etc.), such as a first arithmetic circuit corresponding to a first stage via which the first model instance is generated, a second arithmetic circuit corresponding to a second stage via which the second model instance is generated, a third arithmetic circuit corresponding to a third stage via which the third model instance is generated, etc. For each circuit of the arithmetic circuits, the prover system may compute a witness that is a satisfying input to the circuit that includes the secret input information (corresponding to original model $M_T$ and the training data T in our case). It would further commit to certain values in the computation, using a polynomial commitment scheme. The prover system may then use the prover key associated with the prover to generate the respective zero-knowledge proof and store the zero-knowledge proof to be accessible for a verifier (e.g., at a blockchain address on a blockchain). The verifier may then use the verifier key (e.g., a public verifier key) to verify the proof, without revealing any sensitive information.

In some embodiments, if verification is to be restricted to some subset of entities (e.g., those that know which user's data is being unlearned), then a selective disclosure system may be created. For example, the trusted setup ceremony may be modified to the shared secret (e.g., identity or information specific to the user whose data is being unlearned) in the generation of the proving and verifier key so that only the parties with this secret can generate the correct verifier key. The prover would then generate the proof using the prover key that corresponds to the modified setup. In this way, for example, only entities with the corresponding secret will be able to perform the verification.

As discussed above, system 100 may facilitate verification that interactions with a machine learning model are with a model resulting from an unlearning process (e.g., an unlearning process initiated in connection with a request to remove certain data from the machine learning model or with one or more other unlearning requests). For example, with respect to a resulting model instance (e.g., resulting from the unlearning process), proof subsystem 114 may generate one or more hash-based values based on one or more user interactions with the resulting model instance and cause storage of the hash-based values on a database (e.g., to enable verification that the resulting model instance has been placed into an environment). As an example, a verification system associated with a verifier may use the hash-based values to verify that the resulting model instance has been placed in a production environment, that the resulting model instance has replaced a prior instance of the machine learning model in an environment, etc. (e.g., as described below or herein elsewhere).

In some embodiments, the resulting model instance may be a final model instance resulting from the unlearning process (e.g., that has "completed" unlearning of data requested by one or more entities to be unlearned by the machine learning model), and a verification system associated with a verifier may confirm that one or more users (e.g., a user of the verification system, users outside an organization of the verifier, or other users) are interacting with the final model instance. It should be noted that, in other embodiments, the resulting model instance may be an intermediate model instance resulting from one or more intermediate stages of the unlearning process or another model instance resulting from one or more other stages of the unlearning process. In such other embodiments, the verification system may confirm that one or more users are interacting with the intermediate model instance or other model instance of the machine learning model (e.g., deployed by model subsystem 116 or other component of system 100).

As an example, the hash-based values may include one or more hash-based values that are generated based on an input of a user interaction of a user with the resulting model instance, a final output of the resulting model instance for the input, one or more outputs of hidden layers of the resulting model instance for the input (e.g., the intermediate outputs prior to a final output of the resulting model instance as a response to the input), or other aspects related to the user interaction. In one use case, the hash-based values may include (i) respective hash-based values corresponding to the input and the final output, (ii) respective hash-based values corresponding to two or more outputs of the hidden layers, (iii) respective hash-based values corresponding to the input and an output of a hidden layer of the resulting model instance for the input, (iv) the final output and the output of the hidden layer, or (v) other combinations thereof with or without one or more other aspects related to the user interaction.

In some embodiments, with respect to a user interaction, proof subsystem 114 may generate one or more hash-based values by generating one or more hashes based on one or more aspects of the user interaction. Additionally, or alternatively, in some embodiments, proof subsystem 114 may generate the hash-based values by generating one or more proofs based on the aspects of the user interaction. For example, proof subsystem 114 may generate a first hash or proof corresponding to a first subset of the user interaction (e.g., the input of the user interaction, the final output of the resulting model instance for the input, one or more outputs of the hidden layers of the resulting model instance for the input, or a combination thereof with or without one or more other aspects related to the user interaction). Proof subsystem 114 may also generate a second hash or proof (e.g., as a second hash-based value of the hash-based values) corresponding to a second subset of the user interaction (e.g., another combination of the foregoing aspects of the user interaction). In one use case, where the hash-based values include the respective proofs, the proofs may be one or more zero-knowledge proofs corresponding to the subsets of the user interaction (e.g., where the proofs are generated via one or more techniques described herein).

In some embodiments, a verification system associated with a verifier may perform verification that a resulting model instance (resulting from an unlearning process) has been placed into an environment (e.g., the environment with which one or more users are currently interacting). As an example, with a copy of the resulting model instance (e.g., purported to be the version currently in production), the verification system may provide the same set of inputs to the resulting model instance (e.g., the same as the inputs corresponding to the hashed-based values stored by the prover system in a distributed database or other database accessible to the verification system) and generate one or more hash-based values corresponding to the aspects of the user interactions (e.g., the inputs and outputs known by the verification system). If the verifier-generated hash-based values match the database-stored hash-based values (e.g., that are purported to represent the user interactions), the verification system may confirm that the copy of the resulting instance (used to generate the verifier-generated hash-based values) is the same as the machine learning model used for the user interactions corresponding to the stored hashed-based values.

As a further example, the verification system may also verify that the resulting model instance in the environment resulted from the unlearning process on the machine learning model (e.g., a prior model instance previously used in the environment). In one scenario, as indicated herein, the verification system may access a copy of the machine learning model (e.g., including the same weights of the prior model instance on which the unlearning process was to be performed) and perform the portions of the unlearning process at which the model instances (corresponding to the database-stored hash-based values) are generated. Using the known generation protocols (used to generate the database-stored hash-based values), the verification system may then generate one or more model instance hash-based values corresponding to the model instances. If the model instance hash-based values (generated by the verification system) match the database-stored hash-based values (e.g., that are purported to represent the user interactions), the verification system may confirm that the unlearning process was performed. As an example, the verification system may generate such confirmation based on a determination that the hash-based values generated by the verification system are the same as the database-stored hash-based values (e.g., and, thus, the verifier-generated model instances generated by the verification system are the same as the model instances used to generate the database-stored hash-based values).

Figure 3:
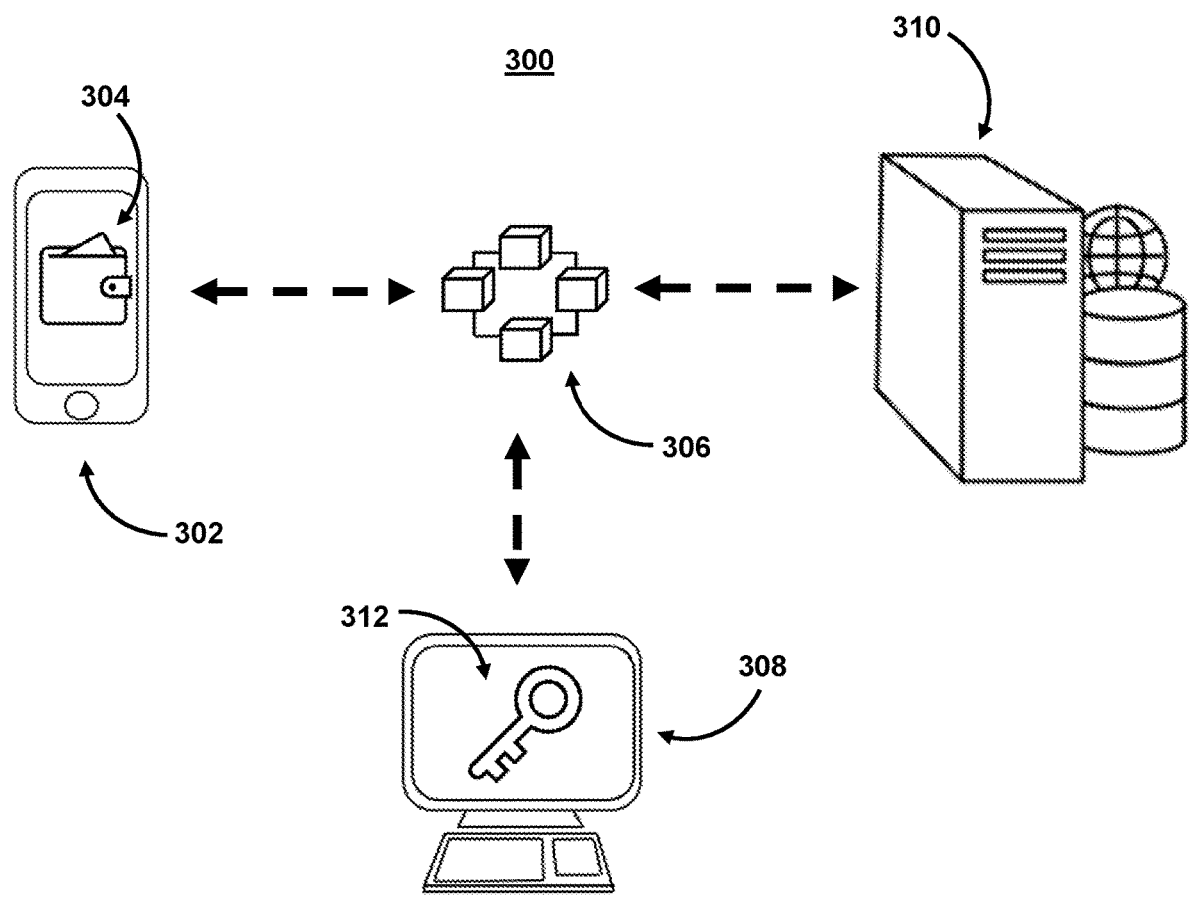
FIG. 3 shows illustrative diagrams for conducting blockchain operations, in accordance with one or more embodiments.

FIG. 3 shows illustrative diagrams for conducting blockchain operations, in accordance with one or more embodiments. For example, system 300 presents various components that may be used to conduct blockchain operations in some embodiments. FIG. 3 includes user device 302. User device 302 may include a user interface. As referred to herein, a "user interface" may include a mechanism for human-computer interaction and communication in a device, and may include display screens, keyboards, a mouse, and the appearance of a desktop. For example, a user interface may include a way a user interacts with an application or website in order to facilitate verifiability of model unlearning, and the user interface may display content related to the models (or model instances) generated during an unlearning process, hash-based values corresponding to the models or to interactions with the models, etc. As referred to herein, "content" should be understood to mean an electronically consumable user asset, representations of goods or services (including nonfungible tokens), and/or Internet content (e.g., streaming content, downloadable content, Webcasts, etc.), video data, audio data, image data, textual data, etc.

As shown in FIG. 3, system 300 may include multiple user devices (e.g., user device 302, user device 308, and/or user device 310). For example, system 300 may include a distributed state machine, in which each of the component in FIG. 3 acts as a client of system 300. For example, system 300 (as well as other systems described herein) may include a large data structure which holds not only all accounts and balances, but a machine state, which can change from block to block according to a pre-defined set of rules, and which can execute arbitrary machine code. The specific rules of changing state from block to block may be maintained by a virtual machine (e.g., a computer file implemented on and/or accessible by a user device, which behaves like an actual computer) for the system.

While shown as a smartphone, personal computer, and server, respectively, in FIG. 3, it should be noted that user devices may be any computing device, including, but not limited to, a laptop computer, a tablet computer, a hand-held computer, and/or other computing equipment (e.g., a server), including "smart," wireless, wearable, and/or mobile devices. It should be noted that embodiments describing system 300 performing a blockchain operation may equally be applied to, and correspond to, an individual user device (e.g., user device 302, user device 308, and/or user device 310) performing the blockchain operation. That is, system 300 may correspond to the user devices (e.g., user device 302, user device 308, and/or user device 310) collectively or individually.

Each of the user devices may be used by the system to conduct blockchain operations and/or contribute to facilitate verifiability of model unlearning. As referred to herein, "blockchain operations" may include any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may include the creation, modification, detection, and/or execution of a smart contract or program stored on a blockchain. For example, a smart contract may include a program stored on a blockchain that is executed (e.g., automatically without any intermediary's involvement or time loss) when one or more predetermined conditions are met. In some embodiments, a blockchain operation may include the creation, modification, exchange, and/or review of a token (e.g., a digital asset specific blockchain), including nonfungible token. A nonfungible token may include a token that is associated with good, service, smart contract, and/or other content that may be verified by, and stored using, blockchain technology.

In some embodiments, with respect to FIG. 1, model subsystem 116 may deploy one or more machine learning models on-chain programs on a blockchain (e.g., as a smart contract hosted on the blockchain). As an example, a resulting model instance (e.g., resulting from an unlearning process) may be stored or deployed on the blockchain as an on-chain program, with which a verifier or other users may interact. In one scenario, the resulting model instance on the blockchain may be a final model instance resulting from the unlearning process (e.g., that has "completed" unlearning of data requested by one or more entities to be unlearned by the machine learning model), thereby providing the trust and guaranteeing that the updated machine learning model is indeed being used to perform inference or generation tasks.

In some scenarios, one or more intermediate model instance resulting from one or more intermediate stages of the unlearning process may additionally or alternatively be stored or deployed on the blockchain as one or more on-chain programs, respectively. In some use cases (e.g., where homomorphic encryption techniques are applied), the model instances may be derived from an encrypted version of the machine learning model (e.g., as a result of performing the unlearning process on an encrypted version of the machine learning model). In such use cases, the final model instance (e.g., resulting from the unlearning process) may be an encrypted version of the updated machine learning model (e.g., the "new" model or its weights that satisfy a data removal request or one or more criteria related to such data removal request).

In some embodiments, where a first key associated with an entity system (e.g., a prover key or other key) was used to generate hash-based values (e.g., corresponding to model instances of a machine learning model that were generated during an unlearning process), a verification request may be sent to an on-chain program on the blockchain. As an example, the program may be configured to (i) identify a verifier key associated with the entity system (e.g., the verifier key corresponding to the first key) based on the verification request, and (ii) use the verifier key and one or more addresses of the verification request to verify performance of the unlearning process (e.g., or placement of a resulting model instance of the machine learning model in a production environment). As a further example, the program may access the hash-based values corresponding to the model instances using one or more blockchain addresses of the blockchain at which the hash-based values are respectively stored.

In some embodiments, blockchain operations may also include actions related to mechanisms that facilitate other blockchain operations (e.g., actions related to metering activities for blockchain operations) on a given blockchain network. For example, Ethereum, which is an open source, globally decentralized, computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a pre-defined set of rules for the system). When a blockchain operation triggers the execution of a smart contract, the blockchain operation may include an amount of gas that sets the upper limit of what can be consumed running the smart contract. The system may terminate execution of the smart contract if the amount of gas consumed by computation exceeds the gas available in the blockchain operation. For example, in Ethereum, gas includes a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas is earmarked for a blockchain operation may be refunded back to the originator of the blockchain operation, if after the computation is executed, an amount remains unused.

As shown in FIG. 3, one or more user devices may include a digital wallet (e.g., digital wallet 304) used to perform blockchain operations. For example, the digital wallet may include a repository that allows users to store, manage, and trade their cryptocurrencies and assets, interact with blockchains, and/or conduct blockchain operations using one or more applications. The digital wallet may be specific to a given blockchain protocol or the provide access to multiple blockchain protocols.

As shown in FIG. 3, one or more user devices may include a private key (e.g., key 312) and/or digital signature. For example, system 300 may use cryptographic systems for conducting blockchain operations, such as transmitting data to be stored on a blockchain, sending a data removal request to a smart contract, sending a verification request to a smart contract, etc. For example, system 300 may use public-key cryptography, which features a pair of digital keys (e.g., which may include strings of data). In such cases, each pair includes a public key (e.g., which may be public) and a private key (e.g., which may be kept private). System 300 may generate the key pairs using cryptographic algorithms (e.g., featuring one-way functions). System 300 may then encrypt a message (or other blockchain operation) using an intended receiver's public key such that the encrypted message may only be decrypted with the receiver's corresponding private key. In some embodiments, system 300 may combine a message with a private key to create a digital signature on the message. For example, the digital signature may be used to verify the authenticity of blockchain operations. For example, when conducting blockchain operations, system 300 may use the digital signature to prove to every node in the system that it is authorized to conduct the blockchain operations.

For example, system 300 may include a plurality of nodes for the blockchain network. Each node may correspond to a user device (e.g., user device 308). A node for a blockchain network may include an application or other software that records and/or monitors peer connections to other nodes and/or miners for the blockchain network. For example, a miner includes a node in a blockchain network that facilitates in blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 308 may request a blockchain operation (e.g., conduct a transaction). The blockchain operation may be authenticated by user device 308 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain operation (e.g., using key 312), the blockchain operation may be authorized. For example, after the blockchain operation is authenticated between the users, system 300 may authorize the blockchain operation prior to adding it to the blockchain. For example, system 300 may add the blockchain operation to blockchain 306. System 300 may perform this based on a consensus of the user devices within system 300. For example, system 300 may rely on a majority (or other metric) of the nodes in the community network (e.g., user device 302, user device 308, and/or user device 310) to determine that the blockchain operation is valid. In response to validation of the block, a node user device (e.g., user device 302, user device 308, and/or user device 310) in the community network (e.g., a miner) may receive a reward (e.g., in a given cryptocurrency) as an incentive for validating the block.

To validate the blockchain operation, system 300 may use one or more validation protocols and/or validation mechanisms. For example, system 300 may use a proof-of-work mechanism in which a user device must provide evidence that it performed computational work to validate a blockchain operation and thus provides a manner for achieving consensus in a decentralized manner as well as preventing fraudulent validations. For example, the proof-of-work mechanism may involve iterations of a hashing algorithms. The user device that is successful aggregates and records blockchain operations from a mempool (e.g., a collection of all valid blockchain operations waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to blockchain 306, and the blockchain operation is completed. For example, to add the blockchain operation to blockchain 306, the successful node (e.g., the successful miner) encapsulates the blockchain operation in a new block before transmitting the block throughout system 300.

Figure 4:
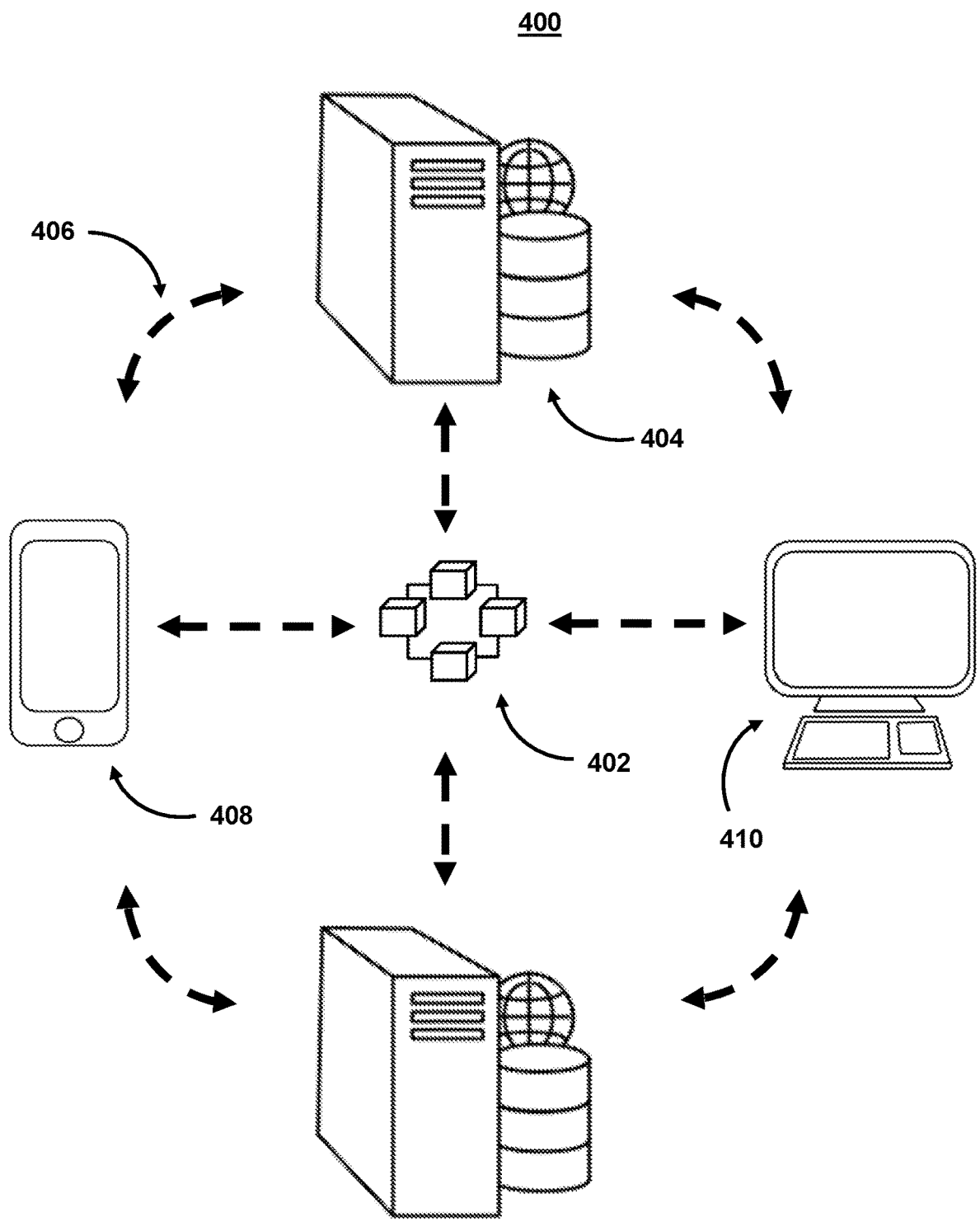
FIG. 4 shows illustrative diagram for a decentralized application, in accordance with one or more embodiments.

FIG. 4 shows illustrative diagram for a decentralized application, in accordance with one or more embodiments. For example, in some embodiments, the system may facilitate model unlearning verifiability within a decentralized application environment. For example, a decentralized application may include an application that exists on a blockchain (e.g., blockchain 402) and/or a peer-to-peer network (e.g., network 406). That is, a decentralized application may include an application that has a backend that is in part powered by a decentralized peer-to-peer network such as a decentralized, opensource blockchain with smart contract functionality.

For example, network 406 may allow user devices (e.g., user devices 408 and 410) within network 406 to share files and access. In particular, the peer-to-peer architecture of network 406 allows blockchain operations (e.g., corresponding to blockchain 402) to be conducted between the user devices in the network, without the need of any intermediaries or central authorities.

In some embodiments, the user devices of system 400 may include one or more cloud components. For example, cloud components may be implemented as a cloud computing system and may feature one or more component devices. It should also be noted that system 400 is not limited to four devices. Users may, for instance, utilize one or more devices to interact with one another, one or more servers, or other components of system 400. It should be further noted, that, while one or more operations (e.g., blockchain operations) are described herein as being performed by a particular component (e.g., user device 408 or 410) of system 400, those operations may, in some embodiments, be performed by other components of system 400. As an example, while one or more operations are described herein as being performed by components of mobile device 408, those operations may, in some embodiments, be performed by components of cloud components 404. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components (e.g., user device 408 and user device 410, respectively). Additionally, or alternatively, a single user (and/or a user account linked to a single user) may interact with system 400 and/or one or more components of system 400 using two different components (e.g., user device 408 and user device 410, respectively).

With respect to the components of system 400, each of these devices may receive content and data via input/output (hereinafter "I/O") paths using I/O circuitry. Each of these devices may also include processors and/or control circuitry to send and receive commands, requests, and other suitable data using the I/O paths. The control circuitry may include any suitable processing, storage, and/or I/O circuitry. Each of these devices may also include a user input interface and/or user output interface (e.g., a display) for use in receiving and displaying data. For example, as shown in FIG. 4, both user device 408 and user device 410 include a display upon which to display data (e.g., content related to one or more blockchain operations).

Additionally, the devices in system 400 may run an application (or another suitable program). The application may cause the processors and/or control circuitry to perform operations related to facilitate verifiability of model unlearning within a decentralized application environment.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes network 406, which may include communication paths between user devices. The communication paths may include the Internet, a mobile phone network, a mobile voice or data network (e.g., a 5G or LTE network), a cable network, a public switched telephone network, or other types of communications networks or combinations of communications networks. The communication paths may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Figure 5:
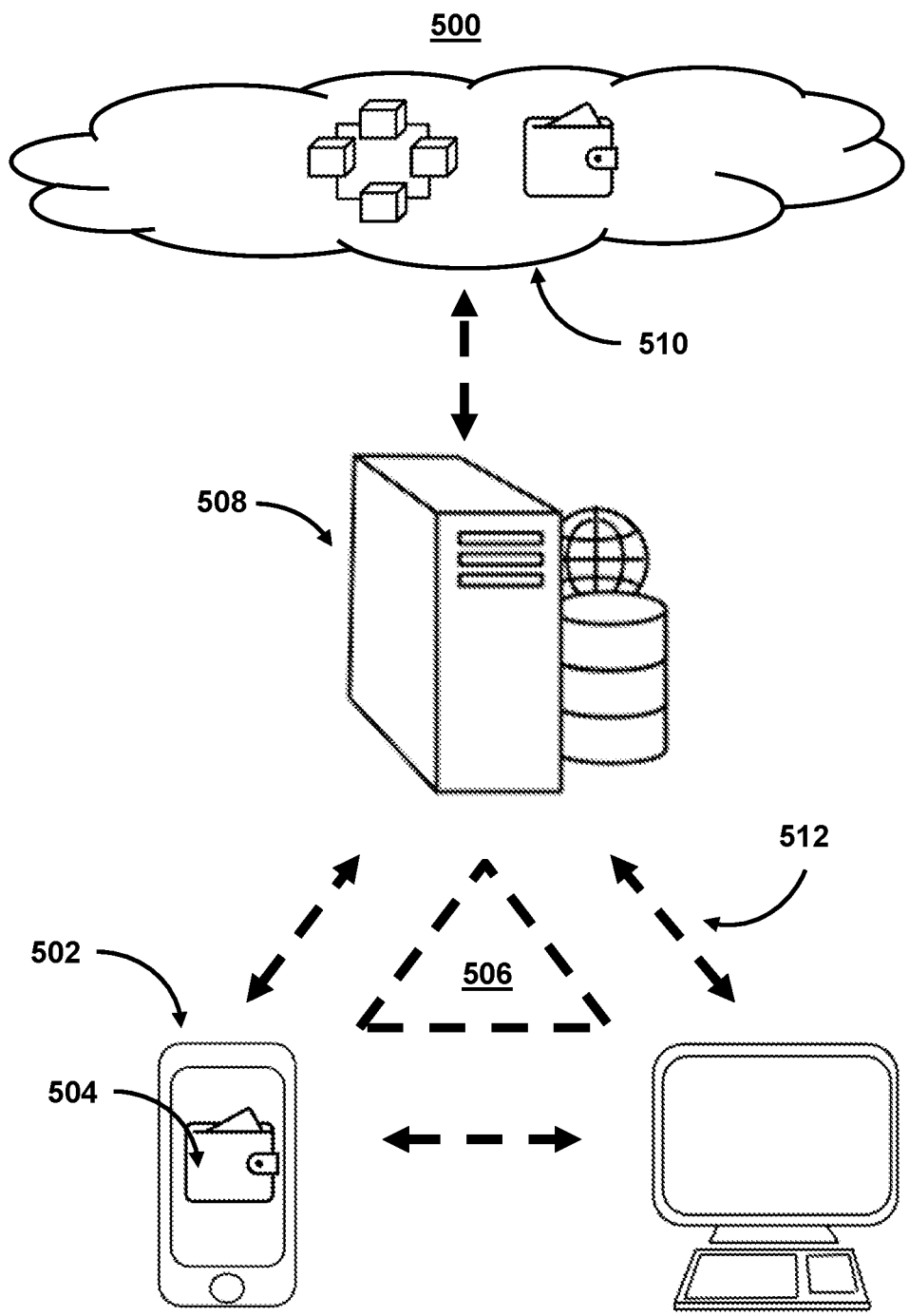
FIG. 5 shows an illustrative diagram for conducting operations in a decentralized application using blockchain operations, in accordance with one or more embodiments.

FIG. 5 shows an illustrative diagram for conducting operations in a decentralized application using blockchain operations, in accordance with one or more embodiments. For example, system 500 may include user device 502. Furthermore, user device 502 may include an application (e.g., application 504) that is implemented on, and/or accessible by, user device 502. For example, application 504 may interact with one or more other applications and/or application programming interfaces (e.g., APIs) in order to facilitate verifiability of model unlearning. For example, application 504 may include a decentralized application digital wallet and/or wallet service that is able to sign and send transactions to transfer tokens (e.g., as payment for a data removal request or a verification request) and/or perform other blockchain operations as well as interact with one or more decentralized applications.

System 500 also includes API layer 506 and network 512 (e.g., a peer-to-peer network). In some embodiments, API layer 506 may be implemented on user device 502. Alternatively or additionally, API layer 506 may reside on one or more of cloud components (e.g., server 508). For example, API layer 506 may reside on a server 508 and include a platform service for a custodial wallet service, decentralized application, etc. API layer 506 (which may be A REST or Web services API layer) may provide a decoupled interface to data and/or functionality of one or more applications.

API layer 506 may provide various low-level and/or blockchain-specific operations in order to facilitate verifiability of model unlearning. For example, API layer 506 may provide blockchain operations such as blockchain writes (e.g., to store hash-based values or other data on the blockchain). Furthermore, API layer 506 may perform a transfer validation ahead of forwarding the blockchain operation (e.g., a transaction) to another service (e.g., a cryptoservice).

API layer 506 may then log the outcome. For example, by logging to the blockchain prior to forwarding, the API layer 506 may maintain internal records and balances without relying on external verification (e.g., which may take up to ten minutes based on blockchain updating activity).

API layer 506 may also provide informational reads. For example, API layer 506 (or a platform service powered by API layer 506) may generate blockchain operation logs and write to an additional ledger (e.g., an internal record and/or indexer service) the outcome of the reads. By doing so, a user accessing the information through other means may see consistent information such that downstream users ingest the same data point as the user.

API layer 506 may also provide a unified API to access balances, transaction histories, and/or other blockchain operations activity records between one or more decentralized applications and custodial user accounts. By do so, the system maintains the security of sensitive information such as the balances and transaction history. Alternatively mechanism for maintaining such security would separate the API access between the decentralized applications and custodial user accounts through the use of special logic. The introduction of the special logic decreases the streamlining of the system, which may result in system errors based on divergence and reconciliation.

API layer 506 may provide a common, language-agnostic way of interacting with an application. In some embodiments, API layer 506 may include a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services, as well as for exchanging information with partners in Business-to-business (B2B) transactions.

API layer 506 may use various architectural arrangements. For example, system 500 may be partially based on API layer 506, such that there is strong adoption of SOAP and RESTful Web-services, using resources like Service Repository and Developer Portal, but with low governance, standardization, and separation of concerns. Alternatively, system 500 may be fully based on API layer 506, such that separation of concerns between layers like API layer 506, services, and applications are in place.

In some embodiments, the system architecture may use a microservice approach. Such systems may use two types of layers: Front-End Layers and Back-End Layers, where microservices reside. In this kind of architecture, the role of the API layer 506 may be to provide integration between Front-End and Back-End. In such cases, API layer 506 may use RESTful APIs (exposition to front-end or even communication between microservices). API layer 506 may use Advanced Message Queuing Protocol (AMQP), which is an open standard for passing business messages between applications or organizations. API layer 506 may use opensource high performance Remote Procedure Call (RPC) framework that may run in a decentralized application environment. In some embodiments, the system architecture may use an open API approach. In such cases, API layer 506 may use commercial or opensource API Platforms and their modules. API layer 506 may use a developer portal. API layer 506 may use strong security constraints applying a web application firewall that protects the decentralized applications and/or API layer 506 against common web exploits, bots, denial-of-service (DDoS) attacks. API layer 506 may use RESTful APIs as standard for external integration.

As shown in FIG. 5, system 500 may use API layer 506 to communicate with and/or facilitate blockchain operations with server 508. For example, server 508 may represent a custodial platform for blockchain operations. For example, a custodial platform may manage private keys stored by a centralized service provider (e.g., server 508). In such cases, server 508 may interact with blockchain 510, a wallet service for blockchain 510, an indexer service for blockchain 510, and/or other platform services.

For example, a wallet service may include an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 506 as opposed to relying on data pulled directly from blockchain 510.

For example, system 500 may maintain its records (e.g., both live and for accounting) in good order separate from balances on blockchain 510. That is, system 500 may maintain an architecture featuring the second ledger, where balances are stored and updated, and the logs of blockchain operations. While conventional systems may rely on directly referencing blockchain 510, since the blockchain is the source of truth in, such reliance leads to additional technical problems.

First, there is a strong likelihood of impedance mismatch between a format for a platform service and the APIs used to retrieve data from the blockchain (e.g., which may lead to accounting imbalances). For example, system 500 may need to be able to generate accounting entries reflecting changes of balances. However, while changes of balances can be tracked by examining blockchain 510, this requires additional processing and computational power.

Second, accounting changes in a blockchain architecture should be irreversible. This is achieved in practice for current blockchain operations by waiting for a variable number of confirmations from the blockchain (e.g., blockchain 510). By waiting for the variable number of confirmations, the likelihood of an error in the blockchain becomes infinitesimal. However, while blockchain services relying of this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node, or they are not.

As such, forks in the blockchain are always possible. In the case of a fork, system 500 may not follow the "right" fork for an undetermined amount of time. If that happens, and if for the purpose of a custodial digital wallet, system 500 decides to move from one fork to another, system 500 may have a more straightforward mechanism to maintain an accurate history of a user account's positions if system 500 stores them independently from a given blockchain.

Furthermore, in case of forks, system 500 perform some internal remediation on user's accounts, which is enable by system 500 maintaining a layer of insulation, from the blockchain, for remedial blockchain operations. For example, system 500 may have a separate storage, protected by the second ledger (e.g., a Ledger Service), for reads, and by a Transfer Service, for writes, that reflect the state of the blockchain that is relevant for system 500 purposes.

Figure 6:
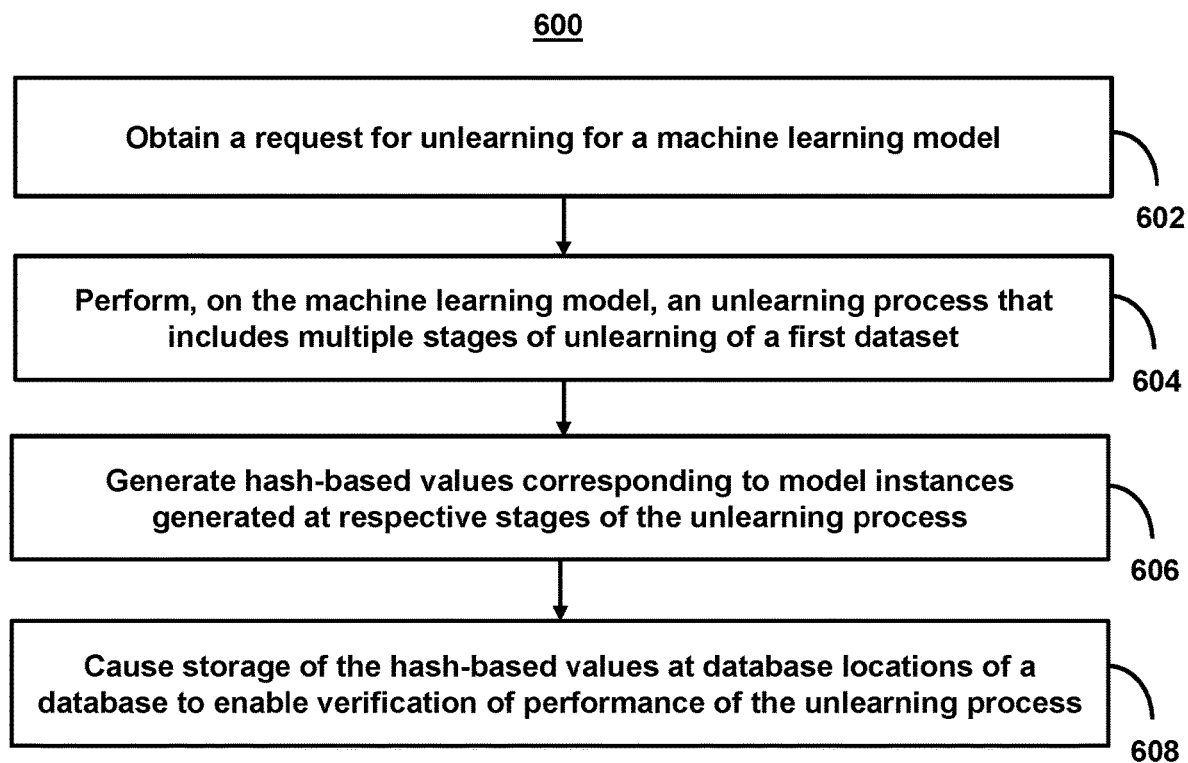
FIG. 6 shows a flowchart of the steps involved in facilitating model unlearning verifiability, in accordance with one or more embodiments.

FIG. 6 shows a flowchart of the steps involved in facilitating model unlearning verifiability, in accordance with one or more embodiments. At step 602, process 600 may include obtaining a request for unlearning for a machine learning model. For example, the system may obtain a removal request to remove a first dataset from the machine learning model or other request for unlearning related to the first dataset.

At step 604, process 600 may include performing, on the machine learning model, an unlearning process that includes multiple stages of unlearning of the first dataset (e.g., including stages at which one or more model instances of the machine learning model are generated). For example, the unlearning process may include one or more stages that have dependencies on one or more other stages of the unlearning process, such as a sequence of operations (or a sequence of operation sets), a set of operations having dependencies on other operations (e.g., which may be captured and described in the form of a directed acyclic graph), etc. As an example, the multiple stages may include a first stage, a second stage that depends on the first stage, a third stage that depends on the second stage, and so on. In one use case, a first model instance of the machine learning model is generated at the first stage, a second model instance of the machine learning model is generated at the second stage, a third model instance of the machine learning model is generated at the third stage, and so on.

In some embodiments, performing the unlearning process on the machine learning model includes encrypting the machine learning model to generate an encrypted machine learning model (e.g., using one or more private keys) and performing the unlearning process on the encrypted machine learning model. As an example, encrypting the machine learning model may include encrypting one or more layers of the machine learning model to generate one or more encrypted layers. In one scenario, the encrypted machine learning model may include the encrypted layers, such as a first encrypted layer or encrypted set of layers (e.g., an encrypted version of a first layer or set of layers of the machine learning model), a second encrypted layer or encrypted set of layers (e.g., an encrypted version of a second layer or set of layers of the machine learning model), a third encrypted layer or encrypted set of layers (e.g., an encrypted version of a third layer or set of layers of the machine learning model), and so on.

As a further example, encrypting the machine learning model may include encrypting one or more weights (or other parameters) of the layers of the machine learning model to generate one or more encrypted weights (or encrypted parameters). In one scenario, the encrypted layers of the machine learning model may include the encrypted weights (or encrypted parameters), such as a first encrypted weight or encrypted set of weights (e.g., an encrypted version of a first weight or set of weights of the machine learning model), a second encrypted weight or encrypted set of weights (e.g., an encrypted version of a second weight or set of weights of the machine learning model), a third encrypted weight or encrypted set of weights (e.g., an encrypted version of a third weight or set of weights of the machine learning model), and so on.

At step 606, process 600 may include generating one or more hash-based values corresponding to the model instances. For example, the hash-based values may include (i) a first hash-based value corresponding to a first model instance of the machine learning model that is generated at the first stage of the unlearning process, (ii) a second hash-based value corresponding to a second model instance of the machine learning model that is generated at a second stage of the unlearning process, (iii) a third hash-based value corresponding to a third model instance of the machine learning model that is generated at a third stage of the unlearning process, and (iv) so on. In some use cases (e.g., where homomorphic encryption techniques are applied), the model instances may be derived from an encrypted version of the machine learning model (e.g., as a result of performing the unlearning process on the encrypted machine learning model). In such use cases, a final model instance resulting from the unlearning process (e.g., that has "completed" unlearning of data requested by one or more entities to be unlearned by the machine learning model) may be an encrypted version of the updated machine learning model that is deployed (e.g., the "new" model or its weights that satisfy a data removal request or one or more criteria related to such data removal request).

In some embodiments, generating the hash-based values may include extracting one or more layers from the first model instance and generating the first hash-based value corresponding to the first model instance based on the layers of the first model instance (e.g., without using one or more other layers of the first model instance as input to a hash function or other cryptographic function as part of the generation of the first hash-based value). Additionally, or alternatively, in some embodiments, generating the hash-based values may include extracting one or more layers from the second model instance and generating the second hash-based value corresponding to the second model instance based on the layers of the second model instance (e.g., without using one or more other layers of the second model instance as input to a hash function or other cryptographic function as part of the generation of the second hash-based value).

In some embodiments, the extracted layers of the respective model instance (or machine learning model) may include one or more hidden layers of the respective model instance, an input layer of the respective model instance, an output layer of the respective model instance, or one or more other layers of the respective model instance. In some embodiments, generating the respective hash-based value based on the respective layers (e.g., the first layers, the second layers, etc.) may include generating, based on one or more weights of the respective layers (e.g., weights of nodes or connections of the nodes of the respective layers), the respective hash-based value corresponding to the respective model instance (e.g., without using one or more other weights of the respective layers, without using one or more weights of the other layers of the respective model instance as input to a hash function or other cryptographic function as part of the generation of the respective hash-based value).

In some embodiments, generating the hash-based values may include generating one or more hashes corresponding to the model instances. For example, the system may generate (i) a first hash (e.g., as the first hash-based value) corresponding to the first model instance, (ii) a second hash (e.g., as the second hash-based value) corresponding to the second model instance, (iii) a third hash (e.g., as the third hash-based value) corresponding to the third model instance, and (iv) so on.

Additionally, or alternatively, in some embodiments, generating the hash-based values may include generating one or more proofs corresponding to the model instances. For example, the system may generate (i) a first zero-knowledge proof (e.g., to produce the first hash-based value) corresponding to the first model instance, (ii) a second zero-knowledge proof (e.g., to produce the second hash-based value) corresponding to a second model instance, (iii) a third zero-knowledge proof (e.g., as the third hash-based value) corresponding to the third model instance, and (iv) so on. Examples of zero-knowledge proof techniques (via which such embodiments are implemented) may include zk-SNARKs (Zero-Knowledge Succinct Non-Interactive Argument of Knowledge), zk-STARKs (Zero-Knowledge Scalable Transparent Argument of Knowledge), Bulletproofs, zk-Rollups, Halo, or other zero-knowledge proof techniques or aspects thereof.

At step 608, process 600 may include causing storage of the hash-based values (corresponding to the model instances) at one or more database locations of a database. In this way, for example, the storage of the hash-based values may enable a verification system to verify performance of the unlearning process, verify that a resulting model instance has replaced its earlier counterpart in a given environment or is otherwise in the given environment, or perform other verifications related to the unlearning process (e.g., verifying that a request to remove certain data from an in-production machine learning model has been completed, that a request to generate a machine learning model that has "unlearned" such data has been completed, or that another unlearning request has been completed).

In some embodiments, where a first key associated with an entity system (e.g., a prover key or other key) was used (e.g., by the entity system) to generate the hash-based values corresponding to the model instances, a verification request may be sent to a program stored on and executing via the database (e.g., a smart contract or other on-chain program on a blockchain, a distributed application hosted on a distributed database, etc.). As an example, the program may be configured to (i) identify a verifier key associated with the entity system (e.g., the verifier key corresponding to the first key) based on the verification request, and (ii) use the verifier key and one or more addresses of the verification request to verify performance of the unlearning process (e.g., or placement of a resulting model instance of the machine learning model in a production environment). As a further example, the program may access the hash-based values corresponding to the model instances using addresses of the database locations (e.g., blockchain addresses of a blockchain or other addresses indicated by the verification request).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the component, devices or equipment discussed in relation to the figures above could be used to perform one or more of the steps in FIG. 6.

Figure 7:
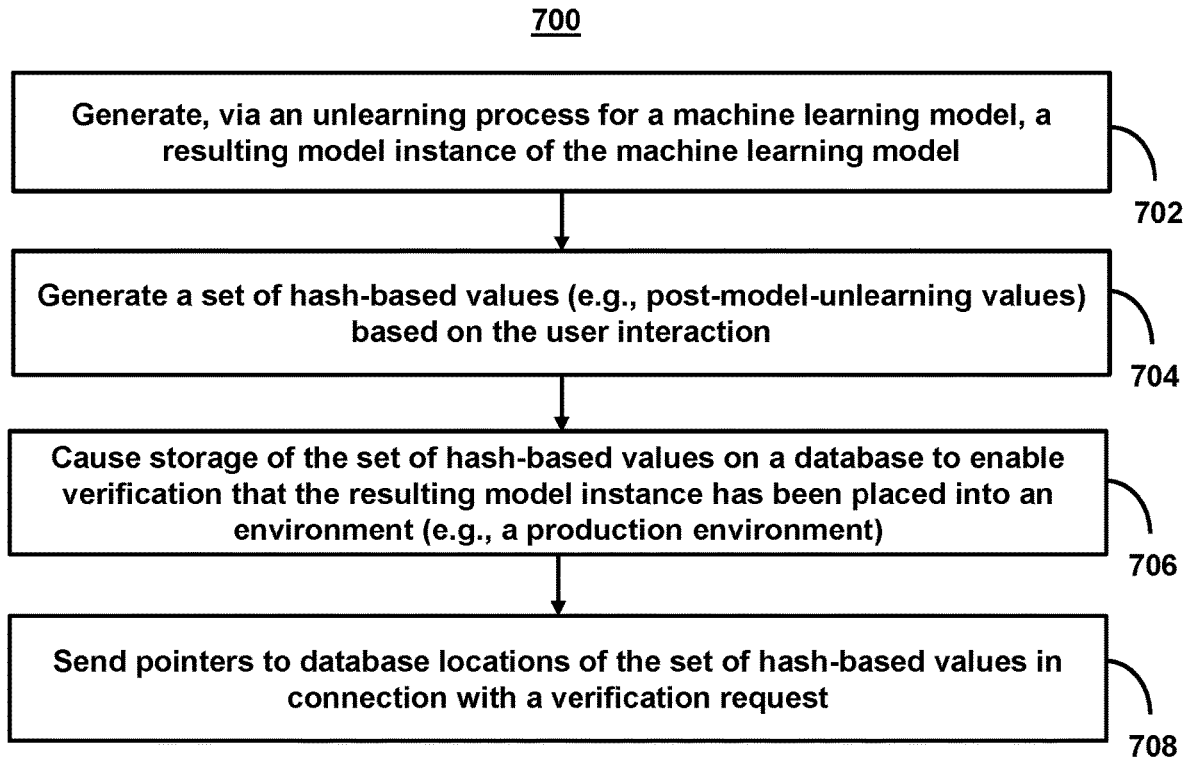
FIG. 7 shows a flowchart of the steps involved in facilitating verification that one or more resulting models, resulting from unlearning, are in a given environment, in accordance with one or more embodiments.

FIG. 7 shows a flowchart of the steps involved in facilitating verification that one or more resulting models, resulting from unlearning, are in a given environment, in accordance with one or more embodiments. At step 702, process 700 may include generating, via an unlearning process for a machine learning model, a resulting model instance of the machine learning model. For example, a resulting model instance may be a final model instance resulting from the unlearning process (e.g., that has "completed" unlearning of data requested by one or more entities to be unlearned by the machine learning model). As another example, the resulting model instance may be an intermediate model instance resulting from one or more intermediate stages of the unlearning process.

At step 704, process 700 may include generating a set of hash-based values based on one or more user interactions with the resulting model instance. For example, the set of hash-based values may include one or more hash-based values that are generated based on an input of a user interaction of a user with the resulting model instance, a final output of the resulting model instance for the input, one or more outputs of hidden layers of the resulting model instance for the input (e.g., the intermediate outputs prior to a final output of the resulting model instance as a response to the input), or other aspects related to the user interaction. In one use case, the set of hash-based values may include (i) respective hash-based values corresponding to the input and the final output, (ii) respective hash-based values corresponding to two or more outputs of the hidden layers, (iii) respective hash-based values corresponding to the input and an output of a hidden layer of the resulting model instance for the input, (iv) the final output and the output of the hidden layer, or (v) other combinations thereof with or without one or more other aspects related to the user interaction.

In some embodiments, generating the hash-based values may include generating one or more hashes based on one or more aspects of the user interaction. Additionally, or alternatively, in some embodiments, generating the hash-based values may include generating one or more proofs based on one or more aspects of the user interaction. For example, the system may generate a first hash or proof (e.g., as a first hash-based value of the hash-based values) corresponding to a first subset of the user interaction (e.g., the input of the user interaction, the final output of the resulting model instance for the input, one or more outputs of the hidden layers of the resulting model instance for the input, or a combination thereof with or without one or more other aspects related to the user interaction). The system may also generate a second hash or proof (e.g., as a second hash-based value of the hash-based values) corresponding to a second subset of the user interaction (e.g., another combination of the foregoing aspects of the user interaction). In one use case, where the hash-based values include the respective proofs, the proofs may be one or more zero-knowledge proofs corresponding to the subsets of the user interaction.

At step 706, process 700 may include causing storage of the set of hash-based values on a database (e.g., to enable verification that the resulting model instance has been placed into an environment). As an example, the storage of the set of hash-based values may enable verification that the resulting model instance has been placed in a production environment. As another example, the storage of the set of hash-based values may enable verification that the resulting model instance has replaced a prior instance of the machine learning model in the environment (e.g., the instance of the machine learning model that was the current version at the time of the corresponding unlearning request or prior to the performance of the unlearning process).

At step 708, process 700 may include sending one or more pointers to one or more database locations of the set of hash-based values in connection with a verification request. For example, in connection with receiving the verification request from a verification system, a response to the verification request may be generated to include one or more of the pointers (e.g., one or more URLs having indications of the database locations, one or more blockchain addresses corresponding to locations on a blockchain at which the hash-based values are stored, or other references to such database locations) and transmitted to the verification system.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the component, devices or equipment discussed in relation to the figures above could be used to perform one or more of the steps in FIG. 7.

In some embodiments, the various computers and subsystems illustrated in FIG. 1 may include one or more computing devices that are programmed to perform the functions described herein. The computing devices may include one or more electronic storages (e.g., database(s) 132, which may include distributed database(s) 134, centralized database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes and is not intended to be limiting, because any of subsystems 112-116 may provide more or less functionality than is described. For example, one or more of subsystems 112-116 may be eliminated, and some or all of its or their functionality may be provided by other subsystems of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: performing an unlearning process on a machine learning model, the unlearning process comprising one or more portions (e.g., stages or other portions of the unlearning process), for the unlearning of a first dataset, at which one or more model instances of the machine learning model are respectively generated; generating one or more cryptographic values corresponding to the model instances, the cryptographic values comprising a first cryptographic value corresponding to a first model instance of the machine learning model generated at a first portion of the unlearning process (e.g., a first stage or other portion of the unlearning process); and causing storage of the cryptographic values at one or more database locations of a database (e.g., to enable a verification system to verify performance of the unlearning process).

2. The method of the preceding embodiment, wherein the cryptographic values comprise a second cryptographic value corresponding to a second model instance of the machine learning model generated at a second portion of the unlearning process (e.g., a second stage or other portion of the unlearning process).

3. The method of any of the preceding embodiments, wherein generating the cryptographic values comprises: extracting one or more first layers from the first model instance; and generating, based on the one or more first layers, the first cryptographic value corresponding to the first model instance (e.g., without using one or more other layers of the first model instance as input to a cryptographic function (e.g., a hash function, a digital signature generation algorithm, a zero-knowledge proof algorithm, etc.) as part of the generation of the first cryptographic value), and wherein causing the storage of the cryptographic values comprises causing the first cryptographic value to be stored at a first database location of the database.

4. The method of the preceding embodiment, wherein the first layers comprise one or more hidden layers of the first model instance (e.g., a penultimate layer of the first model instance prior to an output layer of the first model instance, one or more other hidden layers of the first model instance, etc.), an input layer of the first model instance, an output layer of the first model instance, or one or more other layers of the first model instance.

5. The method of any of the preceding embodiments 3-4, wherein generating, based on the first layers, the first cryptographic value corresponding to the first model instance comprises generating, based on one or more weights of the first layers (e.g., weights of nodes or connections of the nodes of the first layers), the first cryptographic value corresponding to the first model instance (e.g., without using one or more other weights of the first layers, without using one or more weights of the other layers of the first model instance as input to a cryptographic function as part of the generation of the first cryptographic value).

6. The method of any of the preceding embodiments, wherein generating the cryptographic values comprises generating a first zero-knowledge proof (e.g., to produce the first cryptographic value) corresponding to the first model instance, and wherein causing the storage of the cryptographic values comprises causing the first zero-knowledge proof corresponding to the first model instance to be stored at a first database location of the database.

7. The method of any of the preceding embodiments, wherein generating the cryptographic values comprises generating a second zero-knowledge proof (e.g., to produce a second cryptographic value) corresponding to a second model instance, and wherein causing the storage of the cryptographic values comprises causing the second zero-knowledge proof corresponding to the second model instance to be stored at a second database location of the database.

8. The method of any of the preceding embodiments, wherein causing the storage of the cryptographic values comprises submitting the cryptographic values to a blockchain to be stored at one or more blockchain addresses of the blockchain.

9. The method of any of the preceding embodiments, wherein generating the cryptographic values comprises generating one or more hashes corresponding to the model instances, the hashes comprising a first hash corresponding to the first model instance of the machine learning model generated at the first portion of the unlearning process, and wherein causing the storage of the cryptographic values comprises causing the first hash to be stored at the first database location of the database.

10. The method of the preceding embodiment, wherein generating the hashes comprises generating one or more signed hashes corresponding to the model instances, the signed hashes comprising a first signed hash corresponding to the first model instance of the machine learning model generated at the first portion of the unlearning process, and wherein causing the storage of the cryptographic values comprises causing the signed first hash to be stored at the first database location of the database.

11. The method of any of the preceding embodiments, wherein generating the cryptographic values comprises generating one or more proofs corresponding to the model instances (e.g., one or more hash-based proofs), the proofs comprising a first proof corresponding to the first model instance of the machine learning model generated at the first portion of the unlearning process, and wherein causing the storage of the cryptographic values comprises causing the first proof to be stored at the first database location of the database.

12. The method of any of the preceding embodiments, wherein generating the cryptographic values comprises using a first key associated with an entity system and performing the unlearning process on the machine learning model to generate the cryptographic values corresponding to the model instances, the method further comprising: sending, to an on-chain program stored on and executing via the database, a verification request comprising one or more addresses of the database locations, wherein the on-chain program is configured to (i) identify a verifier key associated with the entity system (e.g., the verifier key corresponding to the first key) based on the verification request, and (ii) use the verifier key and the one or more addresses of the verification request to verify performance of the unlearning process (e.g., or verify placement of a resulting model instance of the machine learning model in a production environment), the on-chain program accessing the cryptographic values corresponding to the model instances using the addresses of the database locations (e.g., blockchain addresses of a blockchain or other addresses).

13. The method of any of the preceding embodiments, further comprising: in connection with a user interaction with a resulting model instance resulting from the unlearning process performed on the machine learning model, generating a set of cryptographic values (e.g., post-model-unlearning cryptographic values) based on (i) an input of the user interaction and a final output of the resulting model instance for the input, (ii) two or more intermediate outputs of hidden layers of the resulting model instance for the input, (iii) the input and an intermediate output of a hidden layer of the resulting model instance for the input, (iv) the final output and the intermediate output of the hidden layer of the resulting model instance for the input, or (v) one or more other aspects related to the user interaction; and causing storage of the set of cryptographic values on the database (e.g., to enable verification that the resulting model instance has been placed into a production environment).

14. The method of any of the preceding embodiments, wherein performing the unlearning process on the machine learning model comprises: encrypting the machine learning model to generate an encrypted machine learning model (e.g., using one or more private keys); and performing the unlearning process on the encrypted machine learning model.

15. The method of the preceding embodiment, wherein encrypting the machine learning model comprises encrypting one or more layers of the machine learning model to generate one or more encrypted layers, the encrypted machine learning model comprising the one or more encrypted layers (e.g., a first encrypted layer or encrypted set of layers being an encrypted version of a first layer or set of layers of the machine learning model, a second encrypted layer or encrypted set of layers being an encrypted version of a second layer or set of layers of the machine learning model, etc.).

16. The method of the preceding embodiment, wherein encrypting the machine learning model comprises encrypting one or more weights (or other parameters) of the one or more layers of the machine learning model to generate one or more encrypted weights (or encrypted parameters), the one or more encrypted layers comprising the one or more encrypted weights (or encrypted parameters) (e.g., a first encrypted weight or encrypted set of weights being an encrypted version of a first weight or set of weights of the machine learning model, a second encrypted weight or encrypted set of weights being an encrypted version of a second weight or set of weights of the machine learning model, etc.).

17. The method of any of the preceding embodiments, further comprising: generating token subsets corresponding to data subsets of the first dataset, wherein performing the unlearning process comprises using different ones of the token subsets in different portions of the unlearning process to respectively generate the model instances.

18. The method of the preceding embodiment, wherein the token subsets are respectively encrypted versions of the data subsets of the first dataset.

19. The method of any of the preceding embodiments, wherein the database comprises a distributed database configured with a consensus mechanism for committing to a synchronized state of the distributed database across nodes of the distributed database.

20. The method of any of the preceding embodiments, wherein the machine learning model comprises a large language model or other generative machine learning model.

21. The method of any of the preceding embodiments, wherein the machine learning model comprises one or more neural networks (e.g., convolutional neural networks, recurrent neural networks, long short-term memory (LSTM) networks, transformer neural networks, etc.).

22. One or more tangible, non-transitory, machine-readable media storing instructions that, when executed by one or more processes, cause operations comprising those of any of embodiments 1-21.

23. A system comprising: one or more processors; and memory storing instructions that, when executed by the processors, cause the processors to effectuate operations comprising those of any of embodiments 1-21.

24. A system comprising means for performing any of embodiments 1-21.

What is claimed is:

1. A system for facilitating generative model unlearning verifiability, the system comprising:
one or more processors and memories storing instructions that, when executed by the one or more processors, cause operations comprising:
executing a generative machine learning model trained on a training dataset, the training dataset comprising a first dataset that is subsequently indicated by a removal request to be removed from the generative machine learning model;
in connection with the removal request, generating token subsets corresponding to data subsets of the first dataset, and performing an unlearning process on the generative machine learning model that involves multiple unlearning stages at which different ones of the token subsets are used to respectively generate intermediate model instances of the generative machine learning model, the multiple unlearning stages comprising a first unlearning stage and a second unlearning stage that depends from the first unlearning stage;
in connection with the unlearning process, generating model instance hash-based values corresponding to the intermediate model instances, the model instance hash-based values comprising (i) a first hash-based value corresponding to a first intermediate model instance derived from a starting model instance of the generative machine learning model at the first unlearning stage of the unlearning process and (ii) a second hash-based value corresponding to a second intermediate model instance derived from the first intermediate model instance at the second unlearning stage of the unlearning process; and
causing storage of the model instance hash-based values at database locations of a distributed database configured with a consensus mechanism for committing to a synchronized state of the distributed database across nodes of the distributed database, the storage of the model instance hash-based values at the database locations enabling a verification system to verify performance of the unlearning process.

2. The system of claim 1, wherein generating the model instance hash-based values comprises:
extracting one or more first hidden layers from the first intermediate model instance; and
generating, based on the one or more first hidden layers, the first hash-based value corresponding to the first intermediate model instance, without using one or more other hidden layers of the first intermediate model instance as input to a hash function as part of the generation of the first hash-based value,
wherein causing the storage of the model instance hash-based values comprises causing the first hash-based value to be stored at a first database location of the distributed database.

3. The system of claim 1, wherein:
generating the model instance hash-based values comprises generating a first zero-knowledge proof and a second zero-knowledge proof, the first zero-knowledge proof corresponding to the first intermediate model instance, the second zero-knowledge proof corresponding to the second intermediate model instance; and causing the storage of the model instance hash-based values comprises causing the first zero-knowledge proof corresponding to the first intermediate model instance to be stored at a first database location of the distributed database and the second zero-knowledge proof corresponding to the second intermediate model instance to be stored at a second database location of the distributed database.

4. A method comprising:
obtaining, via one or more processors, a request for unlearning of a first dataset for a machine learning model;
performing, via one or more processors, an unlearning process on the machine learning model, the unlearning process comprising multiple stages, for the unlearning of the first dataset, at which model instances of the machine learning model are respectively generated, the multiple stages comprising a first stage and a second stage that depends on the first stage;
generating, via one or more processors, hash-based values corresponding to the model instances, the hash-based values comprising (i) a first hash-based value corresponding to a first model instance of the machine learning model generated at the first stage of the unlearning process and (ii) a second hash-based value corresponding to a second model instance of the machine learning model generated at the second stage of the unlearning process; and
causing, via one or more processors, storage of the hash-based values at one or more database locations of a distributed database, the storage of the hash-based values at the database locations enabling a verification system to verify performance of the unlearning process.

5. The method of claim 4, further comprising:
in connection with a verification request to verify the performance of the unlearning process, sending, to the verification system, pointers of the one or more database locations at which the hash-based values are stored.

6. The method of claim 4, wherein generating the hash-based values comprises:
extracting one or more first layers from the first model instance; and
generating, based on the one or more first layers, the first hash-based value corresponding to the first model instance, without using one or more other layers of the first model instance as input to a hash function as part of the generation of the first hash-based value,
wherein causing the storage of the hash-based values comprises causing the first hash-based value to be stored at a first database location of the distributed database.

7. The method of claim 6, wherein:
extracting the one or more first layers comprises extracting one or more first hidden layers from the first model instance; and
generating the first hash-based value comprises generating, based on the one or more first hidden layers, the first hash-based value corresponding to the first model instance, without using one or more other layers of the first model instance as input to the hash function as part of the generation of the first hash-based value.

8. The method of claim 6, wherein:
extracting the one or more first layers comprises extracting one or more first hidden layers and one or more first output layers from the first model instance; and
generating the first hash-based value comprises generating, based on the one or more first hidden layers and the one or more first output layers, the first hash-based value corresponding to the first model instance, without using one or more other layers of the first model instance as input to the hash function as part of the generation of the first hash-based value.

9. The method of claim 4, wherein:
generating the hash-based values comprises generating a first zero-knowledge proof and a second zero-knowledge proof, the first zero-knowledge proof corresponding to the first model instance, the second zero-knowledge proof corresponding to the second model instance; and
causing the storage of the hash-based values comprises causing the first zero-knowledge proof corresponding to the first model instance to be stored at a first database location of the distributed database and the second zero-knowledge proof corresponding to the second model instance to be stored at a second database location of the distributed database.

10. The method of claim 4, wherein causing the storage of the hash-based values comprises submitting the hash-based values to a blockchain to be stored at one or more blockchain addresses of the blockchain.

11. The method of claim 4, wherein generating the hash-based values comprises using a first key associated with an entity system and performing the unlearning process on the machine learning model to generate the hash-based values corresponding to the model instances, further comprising:
sending, to an on-chain program stored on and executing via the distributed database, a verification request comprising one or more addresses of the one or more database locations,
wherein the on-chain program is configured to (i) identify a verifier key associated with the entity system based on the verification request, and (ii) use the verifier key and the one or more addresses of the verification request to verify performance of the unlearning process, the on-chain program accessing the hash-based values corresponding to the model instances using the one or more addresses of the one or more database locations.

12. The method of claim 4, further comprising:
in connection with a user interaction with a resulting model instance resulting from the unlearning process performed on the machine learning model, generating a set of post-model-unlearning hash-based values based on (i) an input of the user interaction and a final output of the resulting model instance for the input, (ii) two or more intermediate outputs of hidden layers of the resulting model instance for the input, (iii) the input and an intermediate output of a hidden layer of the resulting model instance for the input, or (iv) the final output and the intermediate output of the hidden layer of the resulting model instance for the input; and
causing storage of the set of post-model-unlearning hash-based values on the distributed database, the storage of the set of post-model-unlearning hash-based values enabling verification that the resulting model instance has been placed into a production environment.

13. The method of claim 12, wherein generating the set of post-model-unlearning hash-based values comprises generating a set of zero-knowledge proofs corresponding to (i) the input of the user interaction and the final output of the resulting model instance for the input, (ii) the two or more intermediate outputs of the hidden layers of the resulting model instance for the input, (iii) the input and the intermediate output of a hidden layer of the resulting model instance for the input, or (iv) the final output and the intermediate output of the hidden layer of the resulting model instance for the input.

14. The method of claim 4, further comprising:
in connection with a user interaction with a resulting model instance resulting from the unlearning process performed on the machine learning model, generating a set of hash-based values based on (i) an input of the user interaction, (ii) one or more intermediate outputs of one or more hidden layers of the resulting model instance for the input, and (iii) a final output of the resulting model instance for the input; and
causing storage of the set of hash-based values on the distributed database, the storage of the set of hash-based values enabling verification that the resulting model instance has been placed into a production environment.

15. One or more non-transitory computer-readable media storing instructions that, when executed by one or more processors, cause operations comprising:
obtaining a request for unlearning of a first dataset for a machine learning model;
performing an unlearning process on the machine learning model, the unlearning process comprising multiple stages, for the unlearning of the first dataset, at which model instances of the machine learning model are respectively generated, the multiple stages comprising a first stage and a second stage that depends on the first stage;
generating cryptographic values corresponding to the model instances, the cryptographic values comprising (i) a first cryptographic value corresponding to a first model instance of the machine learning model generated at the first stage of the unlearning process and (ii) a second cryptographic value corresponding to a second model instance of the machine learning model generated at the second stage of the unlearning process; and
causing storage of the cryptographic values at one or more database locations of a database, the storage of the cryptographic values at the one or more database locations enabling a verification system to verify performance of the unlearning process.

16. The one or more non-transitory computer-readable media of claim 15, wherein generating the cryptographic values comprises:
extracting one or more first layers from the first model instance; and
generating, based on the one or more first layers, the first cryptographic value corresponding to the first model instance, without using one or more other layers of the first model instance as input to a cryptographic function as part of the generation of the first cryptographic value,
wherein causing the storage of the cryptographic values comprises causing the first cryptographic value to be stored at a first database location of the database.

17. The one or more non-transitory computer-readable media of claim 15, wherein:
generating the cryptographic values comprises generating a first zero-knowledge proof and a second zero-knowledge proof, the first zero-knowledge proof corresponding to the first model instance, the second zero-knowledge proof corresponding to the second model instance; and
causing the storage of the cryptographic values comprises causing the first zero-knowledge proof corresponding to the first model instance to be stored at a first database location of the database and the second zero-knowledge proof corresponding to the second model instance to be stored at a second database location of the database.

18. The one or more non-transitory computer-readable media of claim 15, wherein causing the storage of the cryptographic values comprises submitting the cryptographic values to a blockchain to be stored at one or more blockchain addresses of the blockchain.

19. The one or more non-transitory computer-readable media of claim 15, wherein generating the cryptographic values comprises using a first key associated with an entity system and performing the unlearning process on the machine learning model to generate the cryptographic values corresponding to the model instances, the operations further comprising:
sending, to an on-chain program stored on and executing via the database, a verification request comprising one or more addresses of the one or more database locations,
wherein the on-chain program is configured to (i) identify a verifier key associated with the entity system based on the verification request and (ii) use the verifier key and the one or more addresses of the verification request to verify performance of the unlearning process, the on-chain program accessing the cryptographic values corresponding to the model instances using the one or more addresses of the one or more database locations.

20. The one or more non-transitory computer-readable media of claim 15, further comprising:
in connection with a user interaction with a resulting model instance resulting from the unlearning process performed on the machine learning model, generating a set of post-model-unlearning cryptographic values based on (i) an input of the user interaction and a final output of the resulting model instance for the input, (ii) two or more intermediate outputs of hidden layers of the resulting model instance for the input, (iii) the input and an intermediate output of a hidden layer of the resulting model instance for the input, or (iv) the final output and the intermediate output of the hidden layer of the resulting model instance for the input; and
causing storage of the set of post-model-unlearning cryptographic values on the database, the storage of the set of post-model-unlearning cryptographic values enabling verification that the resulting model instance has been placed into a production environment.

* * * * *